Patented Jan. 23, 1923.

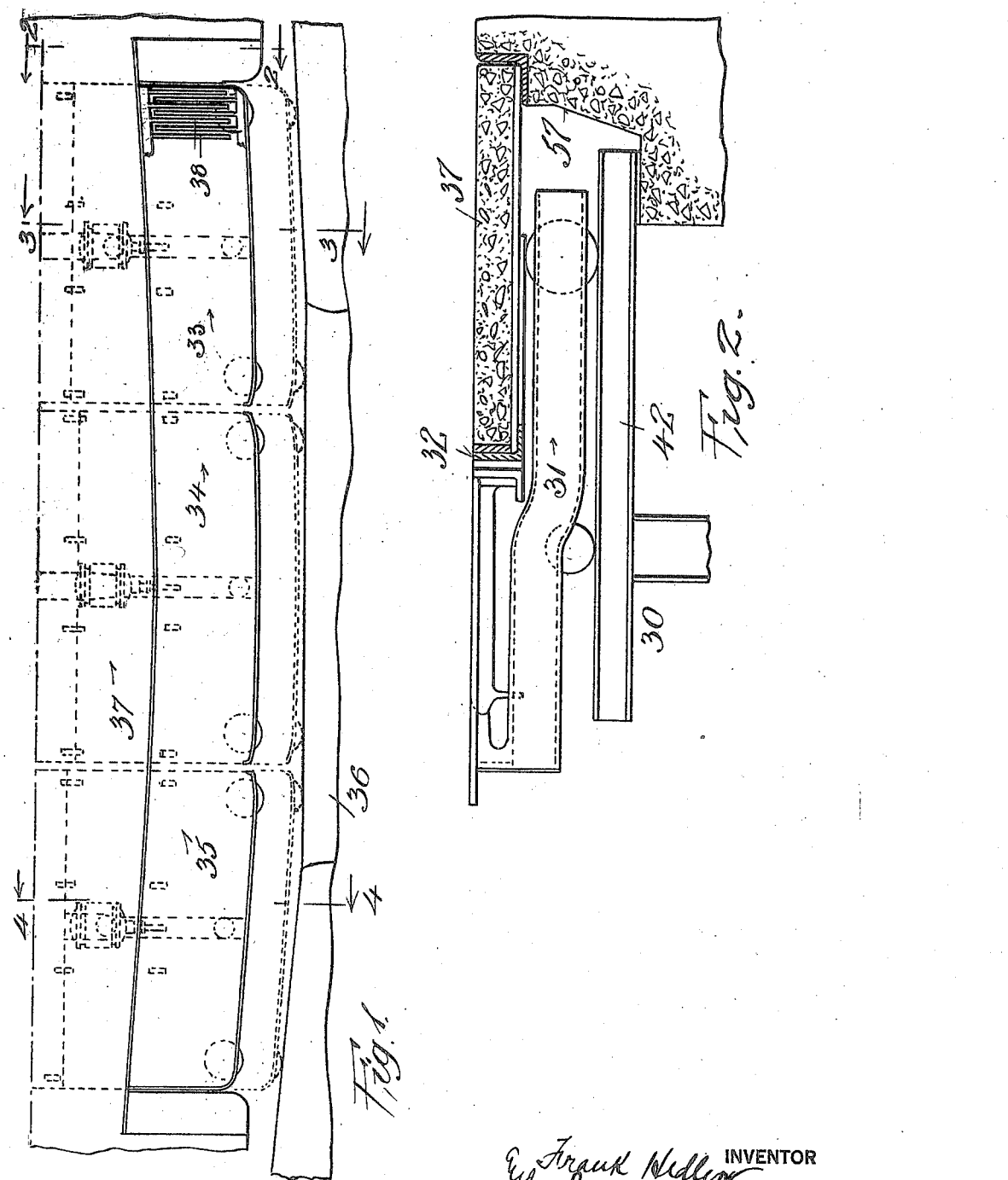

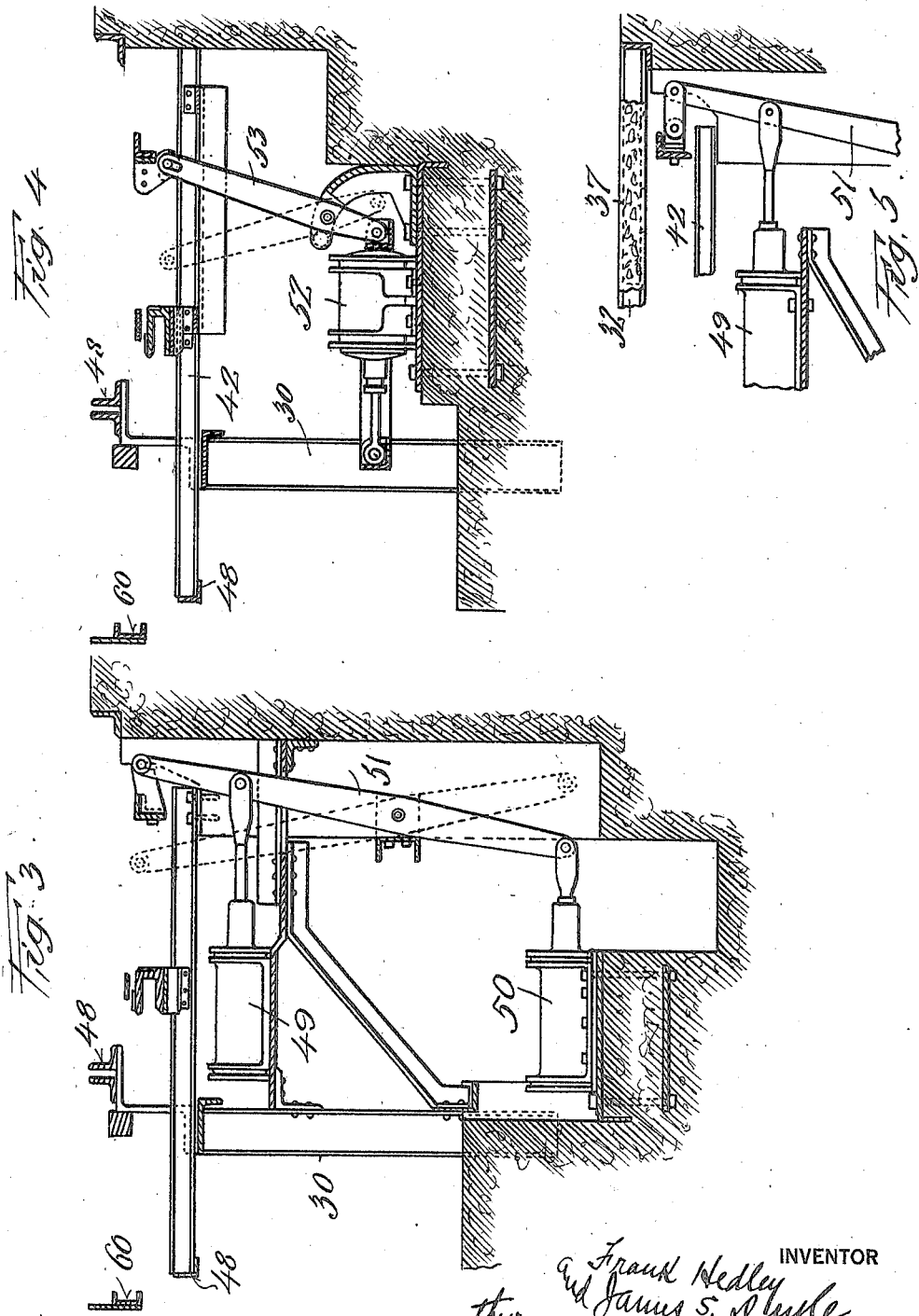

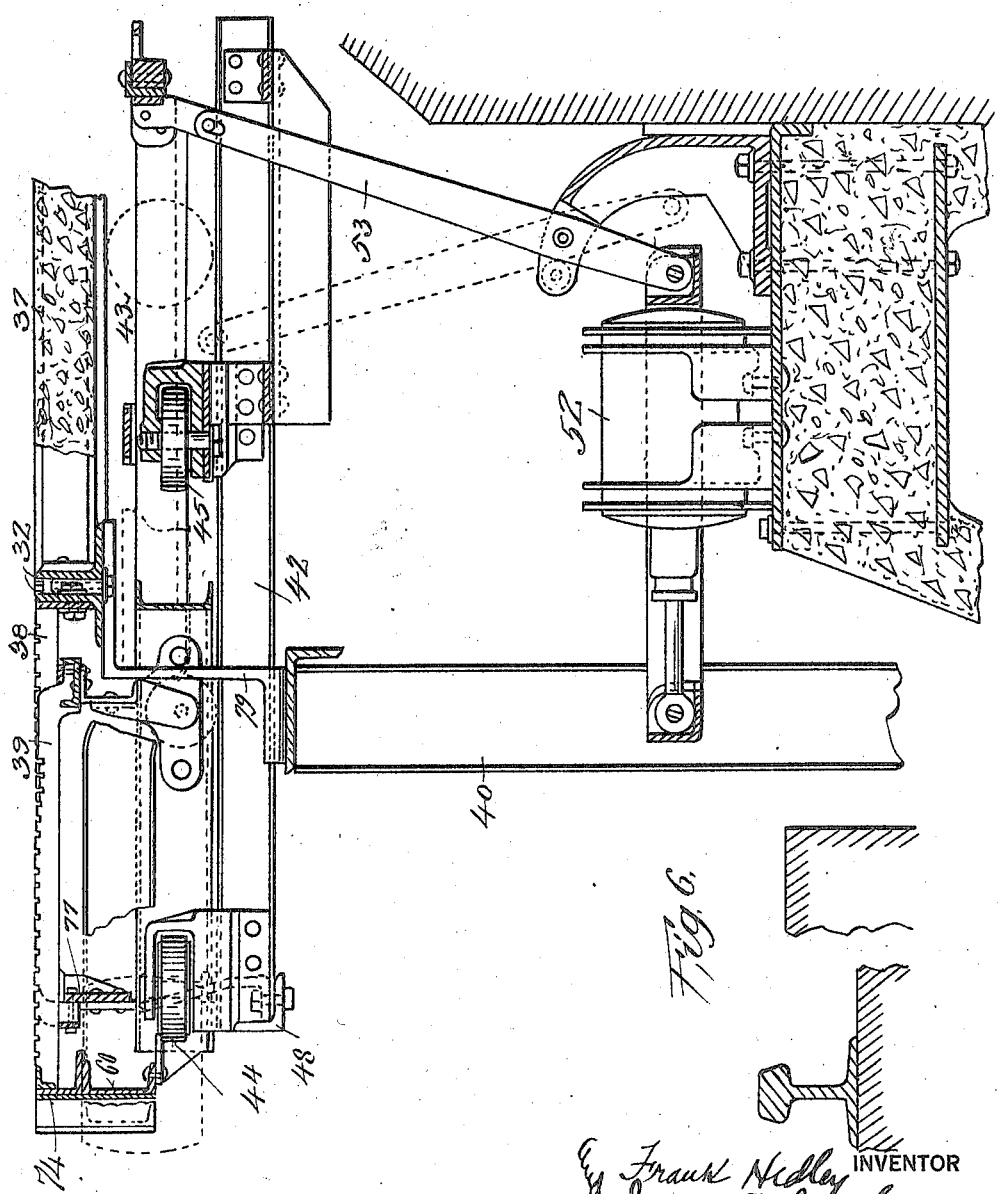

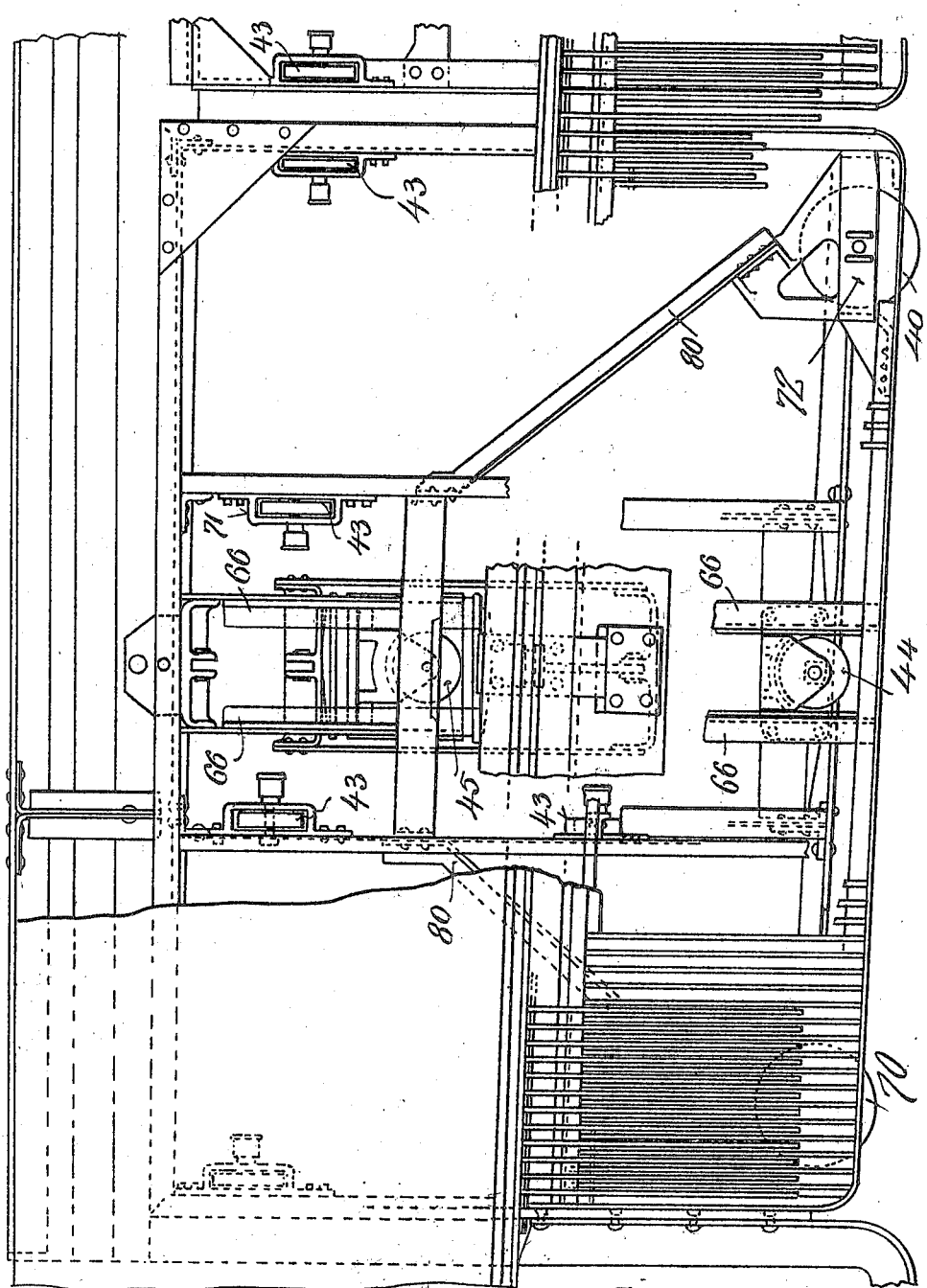

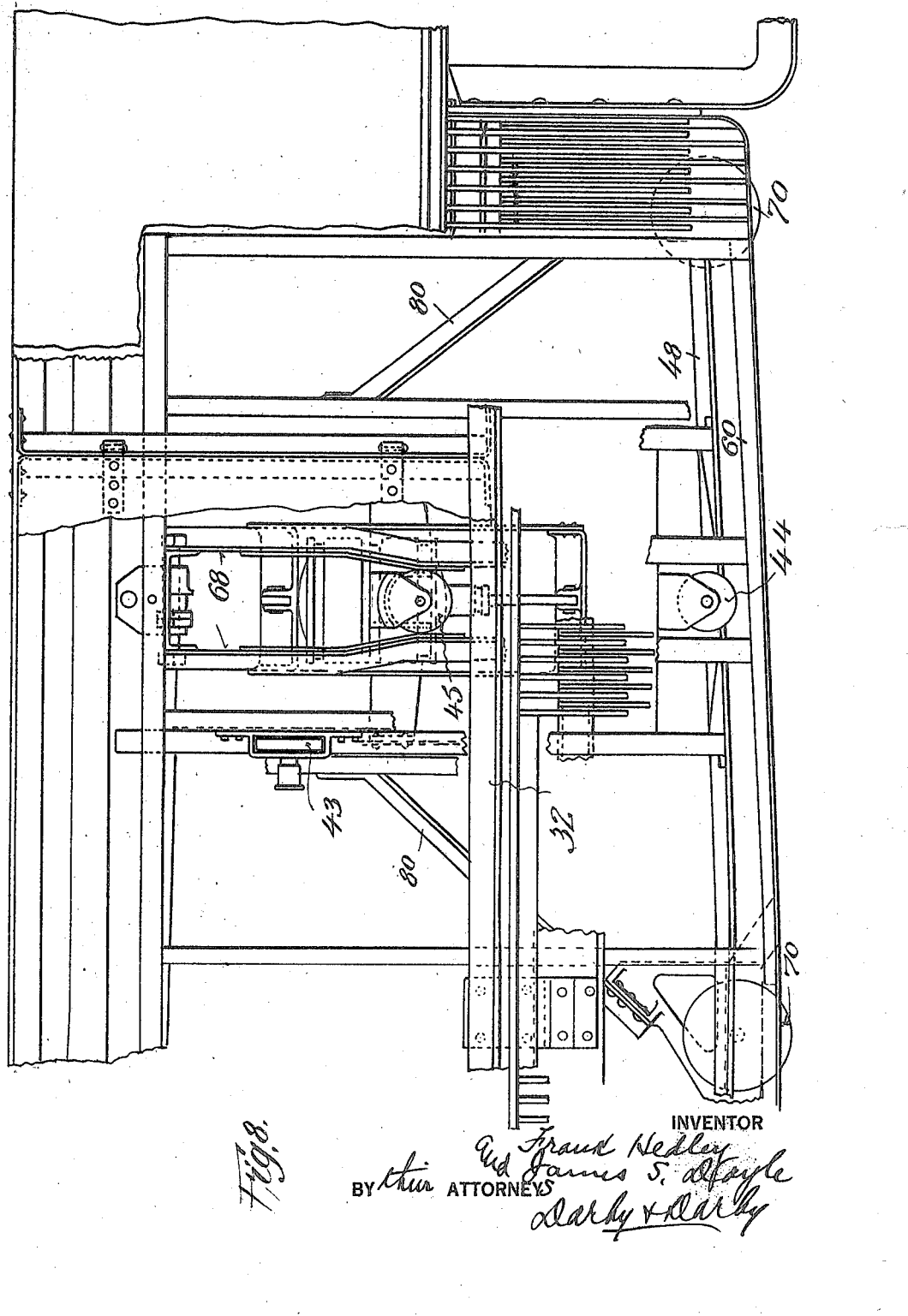

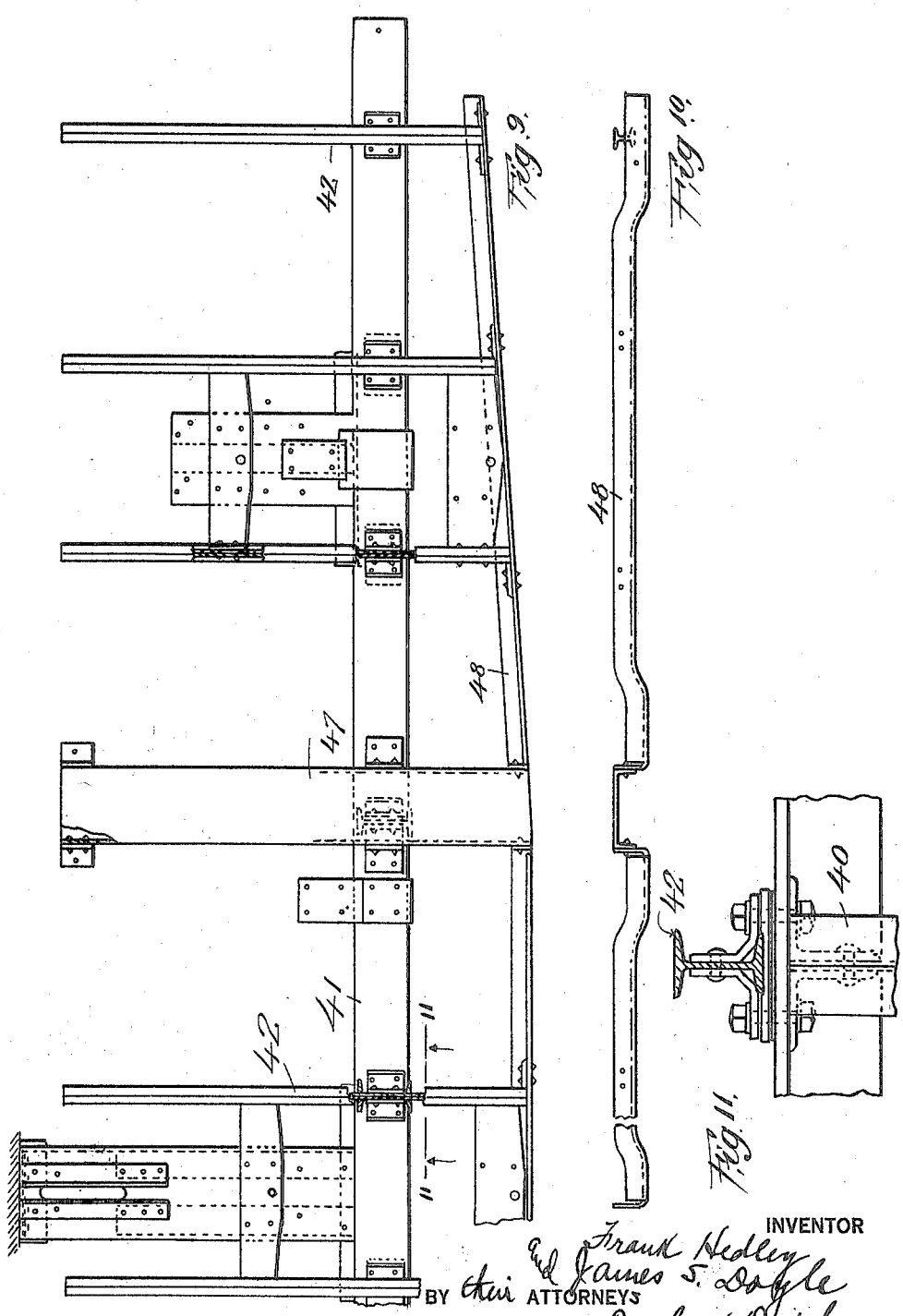

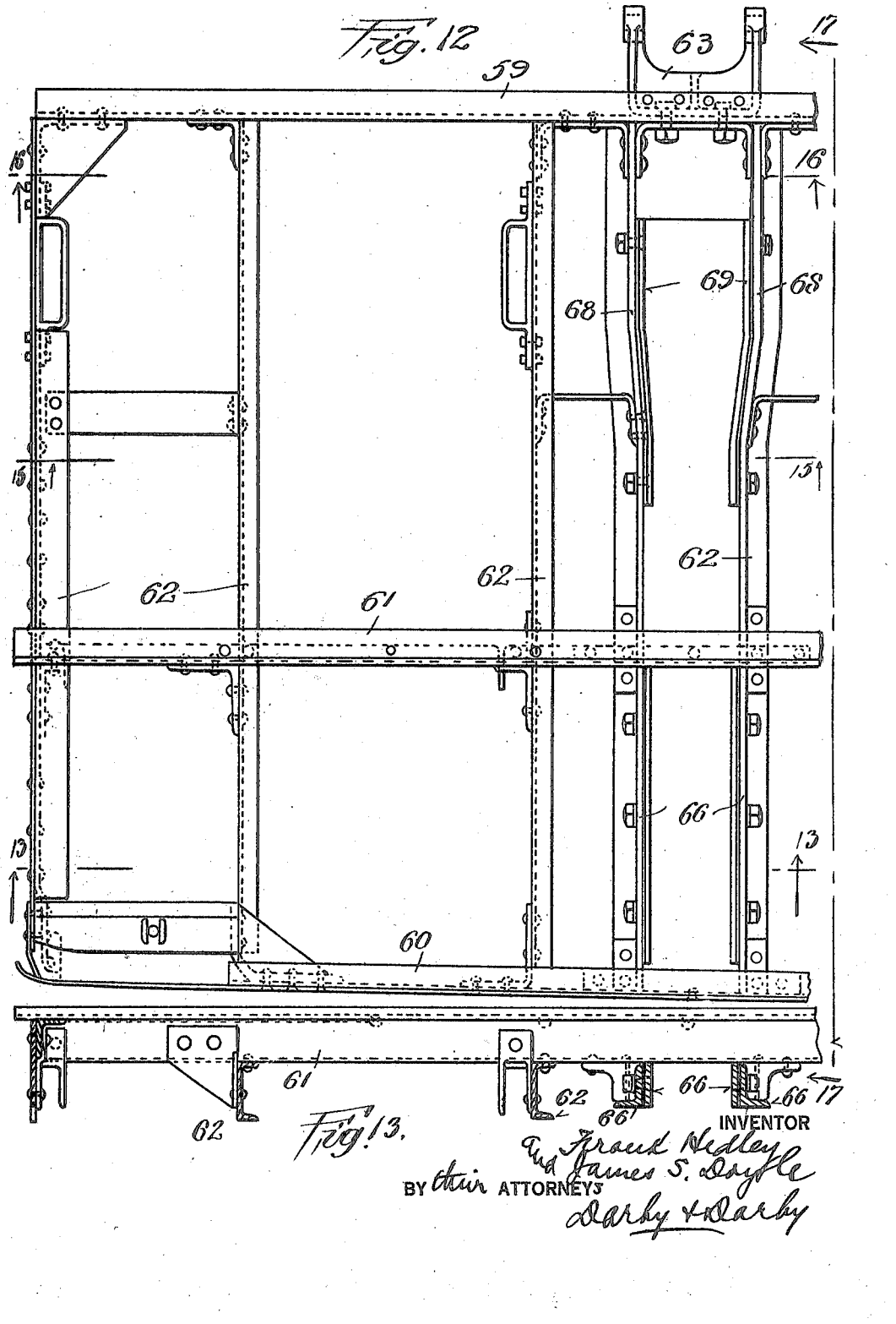

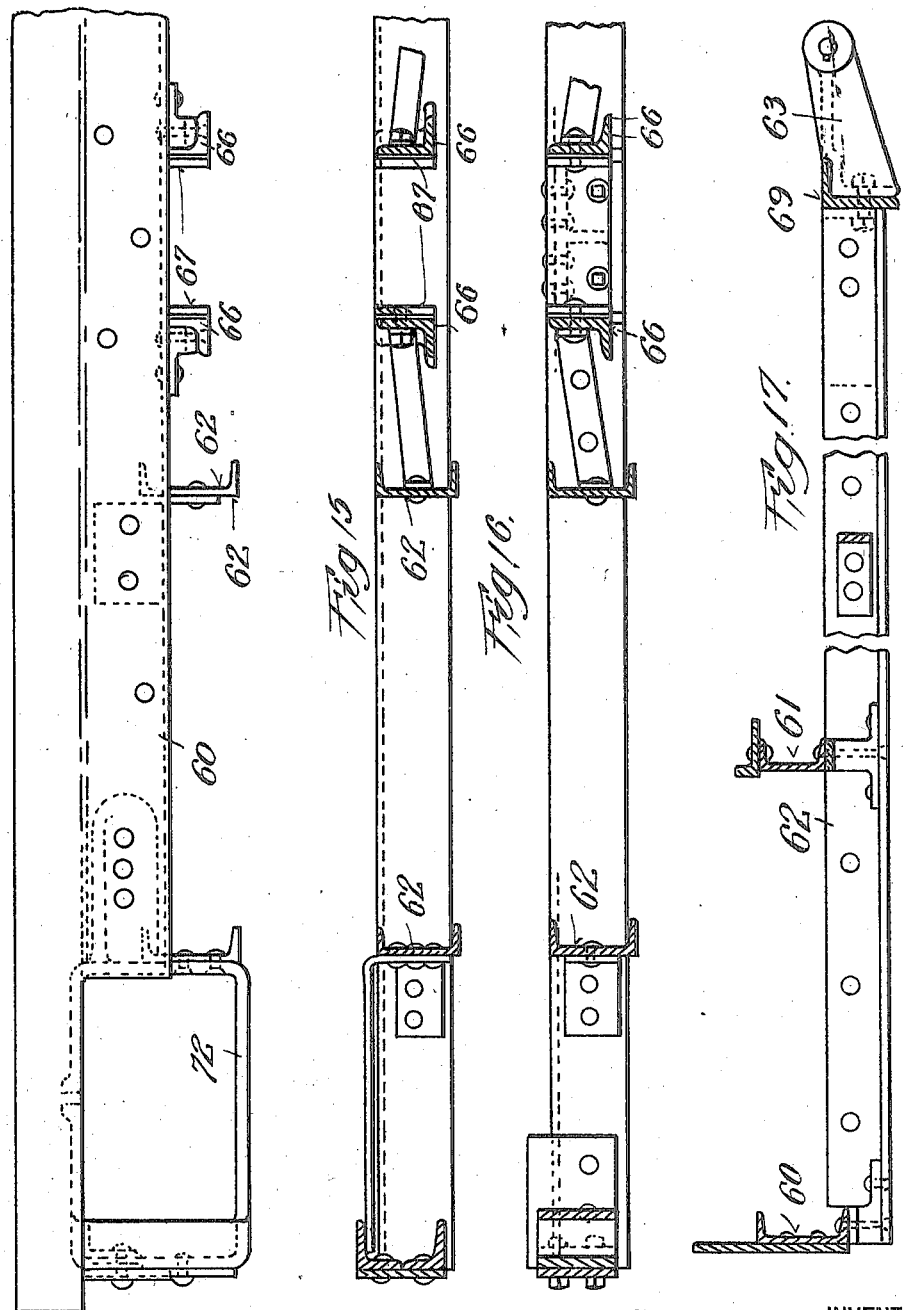

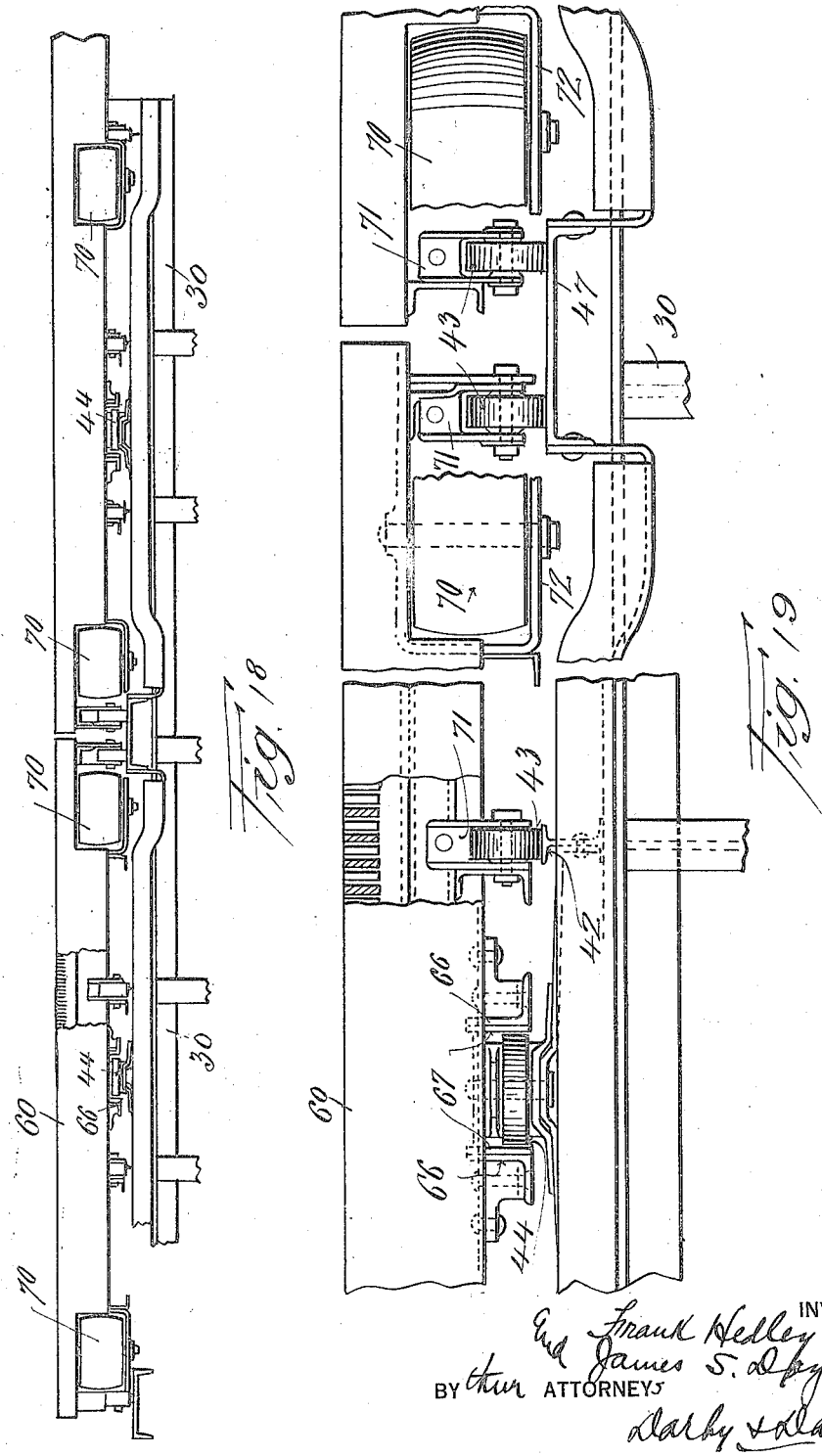

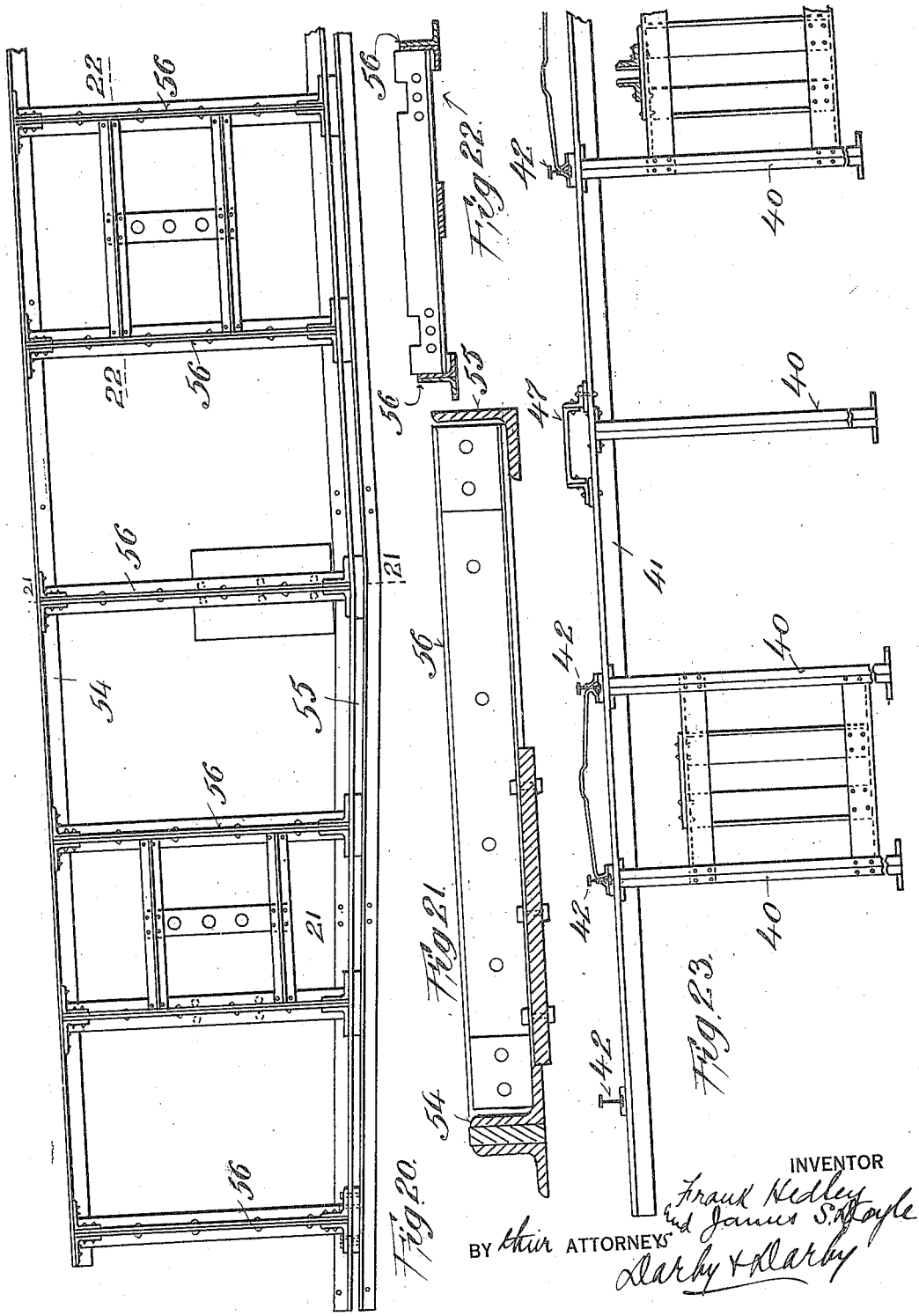

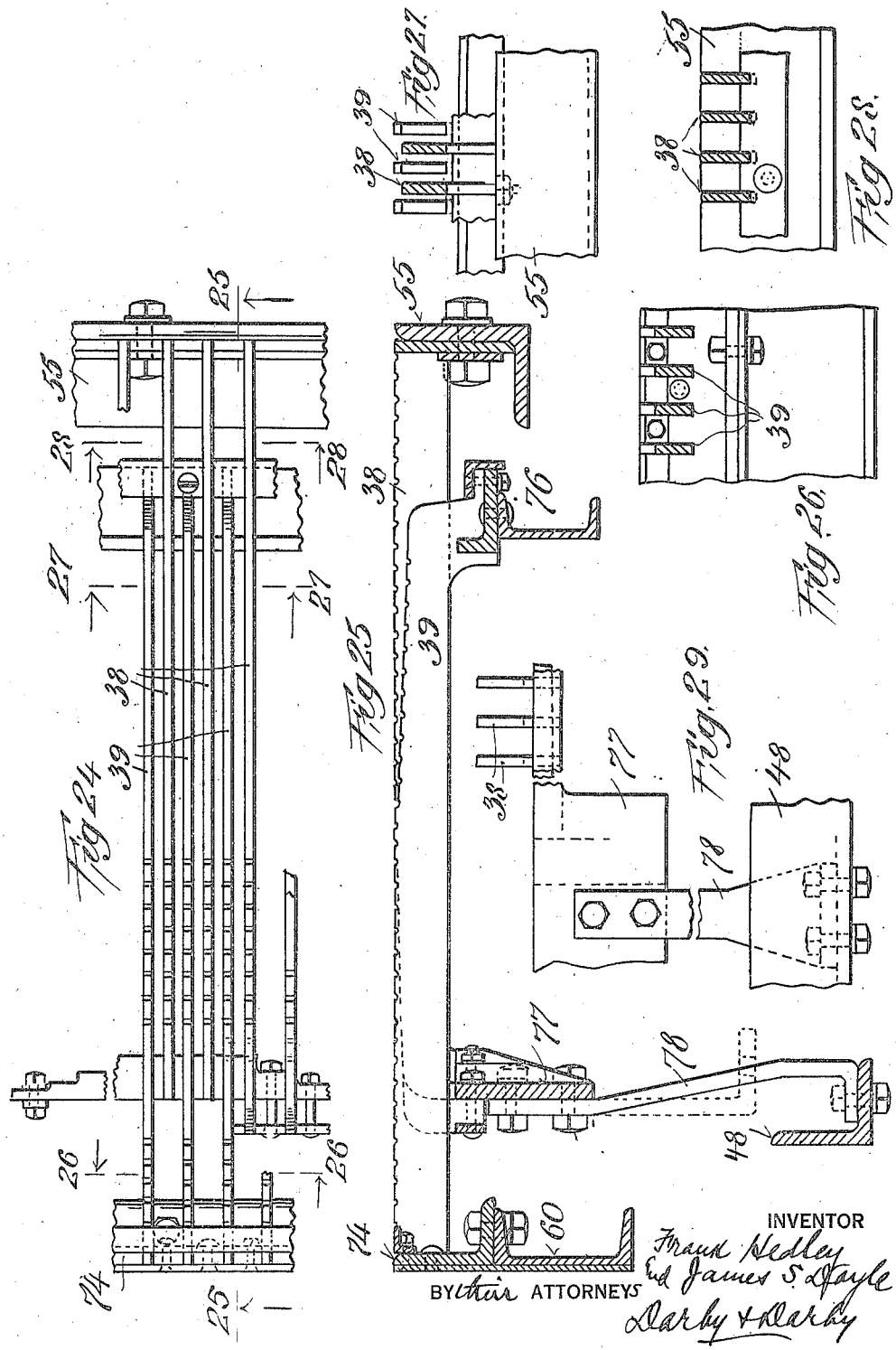

1,443,129

UNITED STATES PATENT OFFICE.

FRANK HEDLEY, OF YONKERS, AND JAMES S. DOYLE, OF MOUNT VERNON, NEW YORK.

SAFETY-PLATFORM MECHANISM.

Application filed June 18, 1921. Serial No. 478,776.

*To all whom it may concern:*

Be it known that we, FRANK HEDLEY and JAMES S. DOYLE, both citizens of the United States, and residents, respectively, of Yonkers and Mount Vernon, in the county of Westchester, State of New York, have made a certain new and useful invention in Safety-Platform Mechanism, of which the following is a specification.

This invention relates to safety platform mechanism, and particularly to gap filling devices between the sides of trains or cars and the approximate edge of a station or landing platform.

The object of the invention is to provide means which are simple and efficient for filling the gap between the sides of trains or cars and the adjacent edge of a station or landing platform, as a safety means to prevent accident or injury to passengers while boarding or alighting from the car or train, and particularly to a gap filling structure for use where the track rails on which the cars or trains operate are curved at the station where the gap filling device is to be employed.

A further object is to provide the station platform or landing with movable sections or segments which are advanced against the side of the car or train when the latter is standing opposite the edge of the station platform, in order to fill the space or gap between the car or train and the stationary part of the station platform or landing, and wherein one or more of the movable platform sections or segments are laterally movable so as to automatically adjust itself to the angle of inclination of the car sides to the edge of the platform where the track is curved at the station or platform.

A further specific object of the invention is to provide a station platform or landing with sections or segments which are advanced towards or retracted from the side of the car or train when standing at a station, and one or more of which sections are automatically movable laterally to accommodate themselves to the angle of inclination of the side of the car or train with relation to the platform edge wherein the edge of the platform instead of being straight is formed in a curve, and particularly in a convexed curve.

Other objects of the invention will appear more fully hereinafter.

The invention consists substantially in the construction, combination, location, and relative arrangement of parts, all as will be more fully hereinafter set forth, as shown by the accompanying drawings, and finally pointed out in the appended claims.

Referring to the accompanying drawings,—

Fig. 1 is a broken view in top plan, somewhat diagrammatic, illustrating a safety platform arrangement embodying the principles of my invention.

Fig. 2 is a view in vertical transverse section on the line 2, 2, Fig. 1, looking in the direction of the arrows.

Fig. 3 is a view similar to Fig. 2 on the line 3, 3, Fig. 2, looking in the direction of the arrows, parts of the stationary portion of the platform being omitted.

Fig. 4 is a view similar to Fig. 3 on the line 4, 4, Fig. 1, looking in the direction of the arrows.

Fig. 5 is a broken detail view of the upper right hand portion of Fig. 3.

Fig. 6 is a view in vertical transverse section on the same plane as Fig. 4 showing the movable and stationary portions of the platform.

Fig. 7 is a view in top plan, parts broken off, and parts broken out, showing the details of mounting and operating one of the movable platform sections corresponding to the arrangement shown in Figs. 4 and 6.

Fig. 8 is a view similar to Fig. 7 showing the details of mounting and operation of an automatically adjustable section of the safety platform.

Fig. 9 is a top plan view, parts broken out and in horizontal section, showing the stationary or foundation structure upon which the movable sections of the platform are to be supported.

Fig. 10 is a detached detail view in front elevation of the forward or edge rail of the station framing.

Fig. 11 is a broken detail view in section on the line 11, 11, Fig. 9, looking in the direction of the arrows.

Fig. 12 is a detail view in top plan of the supporting frame for the movable and automatically adjustable section of the platform.

Fig. 13 is a similar view in section on the line 13, 13, Fig. 12, looking in the direction of the arrows.

Fig. 14 is a view in front elevation of the outer edge of the frame structure shown in Fig. 12.

Fig. 15 is a detail view in section on the line 15, 15, Fig. 12, looking in the direction of the arrows.

Fig. 16 is a similar view on the line 16, 16, Fig. 12, looking in the direction of the arrows.

Fig. 17 is a similar view on the line 17, 17, Fig. 12, looking in the direction of the arrows.

Fig. 18 is a view in front elevation of the movable sections of the platform and the foundation framework and showing the buffer wheels mounted in the front edge of the movable sections.

Fig. 19 is a broken view similar to Fig. 18, somewhat enlarged, parts broken out and in section to more clearly illustrate the structure.

Fig. 20 is a detail view in top plan of the frame work of the stationary part of the platform.

Fig. 21 is a detail view in section on the line 21, 21, Fig. 20.

Fig. 22 is a detail view in section on the line 22, 22, Fig. 20.

Fig. 23 is a view in front elevation of the foundation framework upon which the movable platform sections are to be mounted.

Fig. 24 is a broken detail view in top plan illustrating the telescoping features of the movable and stationary portions of the platform.

Fig. 25 is a view in vertical section on the line 25, 25, Fig. 24.

Figs. 26, 27 and 28 are respectively broken detail views in section on the lines 26, 26; 27, 27; 28, 28, respectively, Fig. 24.

Fig. 29 is a broken view in elevation of the front edge of the stationary part of the platform.

The same part is designated by the same reference numeral wherever it occurs throughout the several views.

In Patent No. 1,149,759, granted to us on August 10, 1915, for safety platform mechanism, we have pointed out that in the construction of street and railway track systems such as subway, elevated and surface lines, and particularly where boarding and alighting platforms are provided for passengers to step directly to and from the same in alighting from or boarding the car or train standing alongside of the platform, it is frequently necessary to leave considerable space between the line of the side of the car or train and the approximate edge of the station or platform in order to provide the necessary clearance therebetween, and that particularly is this true where the station is located on a curve of the track rails. Such a space between the car or train and the station platform is a fruitful source of accident and injury to passengers who are required to alight from or to board the car by stepping across such space and who frequently miss the car or the platform and fall down or are crowded from the car or the platform into such space, thereby receiving injury. In said patent we have shown, described and claimed broadly an arrangement of safety platform mechanism wherein a stationary and a movable platform portion are arranged to operate in the same horizontal plane with means for moving the movable sections of the platform towards and from the side of the car or train located opposite the platform. We have found that in the case where stations are located on a curve of the track rails, and more particularly where the curve of the track rails at the station necessitates a convex curvature of the edge of the platform, that when the movable sections of the safety platform mechanism are advanced towards the side of a car or train standing on the track rails alongside the platform edge, there is still a considerable space left between the forward edge of the advanced platform section and the side of the car adjacent thereto by reason of the inclination of the side of the car or its tangential relation with reference to the edge of the platform section. The result is that when the movable section of the platform is advanced against the side of the car or train the angular or tangential relation between the front edge of the movable platform section and the side of the car is not affected, and that when the movable section of the platform has been so advanced there still remains a dangerous gap or space between its advanced edge and the side of the car. It is among the special purposes of our present invention to avoid this defect and to provide means whereby one or more of the movable platform sections may automatically adjust itself when advanced against the side of the car or train standing opposite thereto so that the front edge of the platform section or sections will lie parallel to and against the side of the car notwithstanding the angle of inclination or tangential relation of the side of the car to the platform edge.

In carrying out our present invention therefore we propose to employ means whereby one or more of the movable platform sections may be automatically tilted laterally when advanced so as to accommodate itself or the front edge thereof to the angle thereto of the side of the car or train.

Generally speaking, a structure embodying our present invention includes the following elements, namely,—first, a foundation frame or framework upon which are mounted movable frames which carry the movable sections of the platforms and the guides therefor; second, frames of the movable sections, which frames are mounted and guided upon the foundation framework; and, third, the framework of the stationary portion of the platform between which and the foundation framing the frames of the movable sections are positioned, held and guided, and in accordance with our invention we so mount one or more of the movable sections of the platform as to permit the same to tilt laterally upon its guiding supports so as to enable the front edge or edges thereof to automatically adjust themselves to the angle of inclination of the side of the car or train into contact with which said sections are advanced. We employ power mechanism to effect the advancing and retracting movements of the movable sections of the platform, but the structures of such power mechanism and the control thereof are fully disclosed in our prior Patent No. 1,149,759 above referred to, and therefore those features and the specific details thereof form no part of our present invention. Referring particularly to Fig. 2 the foundation framework is indicated generally at 30, the movable platform section framework is indicated generally at 31, and the framework for the stationary portion of the platform is indicated generally at 32, it being observed that the framework 31 of the movable platform section is positioned between the foundation framing 30 and the stationary platform framing 32 and is held and guided in this relation. By reference to Fig. 1 we have shown a safety platform arrangement as a practical embodiment of our invention wherein three sections of movable platform portions are shown as indicated at 33, 34, and 35, respectively, the sections 33 and 35 being mounted for rectilinear movement towards and from the sides of the cars indicated at 36 standing adjacent the front edges of said platform sections, and we have indicated the section 34 as being mounted for angular movement in order that its front edge may automatically adjust itself to the angle of inclination of the adjacent side of the car to the edge of the platform. Our invention, however, is not to be limited or restricted in this respect as it is obvious that any number or all of the platform sections may likewise be angularly adjustable.

It will be understood of course that on the front edge of the stationary part of the platform indicated at 37 a series of spaced apart fingers 38 are mounted, and that projecting rearwardly from the front edge of the movable sections of the platform cooperating fingers 39 are employed which alternate with the fingers 38, the upper surfaces of these fingers constituting the standing area of the platform surface, all as more fully described in our former patent referred to above.

The foundation framing 30 is illustrated more in detail in Figs. 9, 10, 11 and 23, and includes in the particular embodiment of our invention which we have selected for illustration vertical standards 40, upon which is supported a frame member 41 which carries track rails 42, along which operate the supporting rollers 43 of the movable platform sections. Also mounted on the foundation frame are the guide rollers 44, 45, see Figs. 6, 7 and 8, which cooperate with the frame of the movable platform section as presently will be more fully explained. The foundation frame also carries one or more broad track members 47, upon which the supporting rollers 43 at the approximate edges of the movable platform sections may be carried as seen most clearly in Fig. 19. A tie member 48, see Figs. 9 and 10, is mounted at the front upper edge of the foundation frame. Suitably supported upon the foundation framing are the motors, by means of which the movable sections of the platform are operated. In Fig. 3 we have shown two motors 49, 50, both connected to an operating lever 51 for a movable section of the platform. In Fig. 4 we have shown a single motor 52 connected by means of a lever 53 to the movable platform sections. Our present invention however is not to be limited or restricted in respect to the number of motors employed nor to the manner of connecting them to the platform sections, nor with respect to the manner of control of said motors, these being features disclosed and claimed in our prior patent above referred to, and forming in the details thereof no part of our present invention.

The framework of the stationary portion of the platform is shown more in detail in Figs. 2, 20, 21 and 22. The particular structure of this framework is of no material consequence, any suitable or convenient framework adapted to carry and support the stationary part 37 of the platform and the fingers 38 thereof being sufficient for our present purposes. As shown however, this stationary platform supporting framework consists of front and rear frame members 54, 55, suitably connected by cross braces 56, and the entire framework being supported by suitable columns or the station foundation indicated at 57 in Fig. 2. The frames for the movable sections of the platform are disposed between the stationary frame for the stationary portion of the platform and the foundation framework as indicated in Fig. 2, and as above explained. The movable frame is shown more fully in detail in Figs. 12 to 17 inclusive, and consists of end portions 59, 60, 61, connected by braces 62, and having connected thereto suitable yoke devices 63 for connection to the motor by which the frame is advanced or retracted. Carried by each movable frame are longitudinal stringers or members 66 forming a track or way in which are received the guide rollers 45 of the foundation frame. These guide rollers are positioned horizontally and serve to guide the movable frames in their advancing and retracting movements. If desired, the guide rails 66 may be faced with wearing plates indicated at 67. In Fig. 7 we have indicated the tracks 66 as extending transversely all the way across the movable frame, while in Figs. 8 and 12 we have shown the arrangement for accommodating the lateral movement of the movable frame. Where the movable platform section is employed which is not automatically adjustable laterally the guides 66 for the guide rollers 45 extend transversely across the movable frames, but where the section is designed to be permitted to tilt horizontally in accordance with our invention and to effect the automatic accommodation of its front edge to the line of inclination of the car body side, the guide channel members 66 are flared away from each other at their rear ends as indicated at 68, see Fig. 12, the wear plates 69 therefor being correspondingly flared. With this arrangement a sufficient space is permitted at the flared portions 68 of the guide channel side members to permit a lateral sidewise rocking or tilting movement of the frame after the frame has been advanced to a point where the guide rollers 45 occupy the space between the flared portions 68. The front frame members 60 of the movable platform sections have mounted therein buffer rollers 70, the function of which is to take the impact of the forward edge of the movable frames when said frames are advanced against the sides of the cars. The rollers 43 operating on the track rails 42 support the movable frames, said rollers being journaled in suitable boxes indicated at 71 mounted on the movable platform section of the frame. It will be observed that two guide rollers 44, 45, are employed for each movable frame, said guide rollers being positioned in line with each other transversely across the movable frame. This affords an efficient bearing for the frame inasmuch as it is guided at different points in its transverse width. Only the rearmost guide roller 45 is disengaged from the side walls of the guiding channel therefor in the case of the automatically adjustable platform sections when said sections are advanced sufficiently for the roller 45 to enter the space formed by the enlarged or flared portions 68 of the guide, and in the laterally adjusting movements of these sections said sections fulcrum around the forward guide rollers 44 thereof. Inasmuch as the automatic laterally adjusting movements of the platform sections are accomplished only after the sections have been advanced to abut against the side of the cars standing opposite thereto the tendency is for the rearmost supporting rollers 43 of the movable sections to be raised slightly above, or the pressure thereof slightly enlarged from the track rails 42, 47, upon which they operate, and consequently no difficulty is experienced in said rollers sliding laterally over the upper surface of their supporting track rails during the laterally adjusting movements of said frame sections. The extent of such lateral movement is comparatively slight, and we have experienced no difficulty with respect to said supporting rollers sliding laterally over the surfaces of their supporting rails in the practical operation of the apparatus.

The buffer rollers 70 are mounted in frames 72 carried by the front rail 60 of the movable frame. The front edge member 60 of the movable frame has secured thereto angle member 74 to which are secured the fingers 39, see particularly Figs. 24 and 25. The rearmost ends of said fingers are secured to a frame member 76 of the movable frame.

As above explained the fingers 38 of the stationary portion of the platform are supported at their rear ends upon a frame member 55 of the stationary frame. The front ends of said fingers 38 are secured to a member 77 which is carried by a bracket 78 supported upon the front member 48 of the foundation frame.

In Fig. 6 we have shown a bracket 79 carried by one of the vertically extending standards 40 of the foundation frame, and which bracket serves to support the stationary frame 32.

Ordinarily the buffer rollers 70 are mounted at the forward corners of the movable sections of the platform. Inasmuch as these buffers are required to take considerable stress and strain in the performance of their buffer function we prefer to efficiently brace the frames 72 in which said rollers are mounted. We accomplish this by providing angle braces 80 which are secured to the frames 70 and to the framework of the movable platform section.

From the foregoing description it will be seen that we provide a simple and efficient arrangement whereby the landing platform is equipped with extensible or relatively movable portions which are mounted to be projected from the edge of the landing platform and which move and have their surfaces in the same plane with that of the platform, one or more of said movable sections not only being movable toward and away from the edge of the platform but also being mounted for swiveling or horizontal tilting movement so that its outer edge will automatically assume a position parallel with and against the side of a car standing opposite it even though the side of the car stands at an angle of inclination relative to the edge of the landing platform, thereby practically filling up the gap or space between the platform and the side of the car, notwithstanding the angular relation of the side of the car to the edge of the platform, such as would be produced where the track along which the car operates is curved at the landing platform and hence affording safety to passengers passing between the car platform. It will also be seen that guides are provided for guiding the movement of the movable sections of the platform, the guiding connections being so arranged in the case of the automatically adjustable platform section as to permit the horizontal swiveling or tilting adjustment of said section to be effected by fulcruming about one of the guides of said section.

It will be understood that many changes in the details of structure and arrangement will readily occur to persons skilled in the art and still fall within the spirit and scope of our invention. While therefore we have shown and described a specific structure our invention as defined in the claims is not to be limited or restricted to the exact details as shown and described, but having now set forth the objects and nature of our invention and a structure embodying the principles thereof what we claim as new and useful and of our own invention and desire to secure by Letters Patent is,—

1. In a safety platform mechanism, the combination with a stationary platform portion and a movable platform portion arranged to operate in the same horizontal plane therewith, means to control the operation of the movable portion, means to permit said movable portion to swing laterally to accommodate the front edge thereof to the line of inclination of the side of a car or train.

2. The combination with a landing platform and a track adjacent the edge thereof, and a platform section mounted to move towards and from the side of a car located on the track, means to permit said platform section to swing laterally with respect to its line of movement towards and from the car, the movements of the platform section being in the same horizontal plane with the landing platform.

3. The combination with a landing platform, of a movable section therefor, and means to project said section beyond the edge of the landing platform in the horizontal plane thereof, said movable section being also mounted for lateral swinging movement.

4. The combination with a landing platform, of a movable section therefor arranged to move in the horizontal plane of the landing platform towards and from the edge thereof, a guide for said movable section, and means to permit said section to fulcrum about said guide.

5. The combination with a landing platform, of a movable section therefor arranged to move in the horizontal plane of the landing platform towards and from the edge thereof, a stationary guide for said movable section, means to move said movable section, and means to permit said section to fulcrum about said guide.

6. The combination with a landing platform, of a movable section therefor arranged to move in the horizontal plane of the landing platform towards and from the edge thereof, a guideway carried by said movable section, a stationary guide working in said guideway, said guideway having an enlarged portion to permit lateral movement of said movable section.

7. The combination with a landing platform, of a movable section having its upper surface in the same plane as that of the platform, and means to move said section towards and from the edge of the platform, said movable section being mounted for horizontal tilting movement to enable its outer edge portion to conform to the line of inclination relative to the platform of the side of a car or train standing adjacent thereto.

8. The combination with a curved portion of track rails and a landing platform adjacent thereto, of a movable section for the platform, said movable section and platform having their upper surfaces in the same horizontal plane, and means to project said movable section from the edge of the platform, said movable section being mounted for horizontal tilting movement to enable its outer edge portion to accommodate itself to alignment with the side of a car standing on the curved track portion.

9. The combination with a landing platform, of movable sections mounted at the edge thereof and having their upper surfaces arranged in the same horizontal plane therewith, and means for moving said sections towards and from the edge of the platform, one of said sections being mounted for horizontal tilting movement.

10. The combination with a landing platform, of a movable section therefor having its upper surface in the same horizontal plane therewith, and mounted for movement towards and from the edge of the platform, aligned guides for guiding said section in its movements towards and from the platform, and means to permit horizontal movement of said sections about one of said guides as a fulcrum.

11. The combination with a landing platform, of a movable section therefor having its upper surface in the same horizontal plane therewith, and mounted for movement towards and from the edge of the platform, a channel structure carried by said section, and stationary guides working in said channel structure, said channel structure having an enlarged portion to permit horizontal movement of said section about one of said guides as a fulcrum.

12. The combination with a foundation framing, platform framing supported thereon, and a landing platform carried by said platform framing, of a movable frame disposed between said foundation and platform framings for movement therebetween, a platform section carried by said movable frame and having its upper surface in the same plane with said landing platform, means to move said movable frame to project said platform section from the edge of said landing platform, means to guide said movable section in its projecting movements, and means to permit said movable section to swivel or tilt horizontally.

13. The combination with a landing platform having fingers at the edge thereof, of a movable section mounted at the edge of said platform, and having cooperating fingers, means for moving said movable section towards and from the edge of the landing platform, and means to permit the movable section to swivel or tilt in a horizontal plane.

14. The combination with a landing platform and a track adjacent thereto, said track being curved opposite the platform, of a movable section for the edge of the platform, said section being movable towards and from the edge of the platform, and also mounted for horizontal swiveling or tilting movement.

In testimony whereof we have hereunto set our hands on this 14th day of June A. D., 1921.

FRANK HEDLEY.
JAMES S. DOYLE.